UNITED STATES PATENT OFFICE.

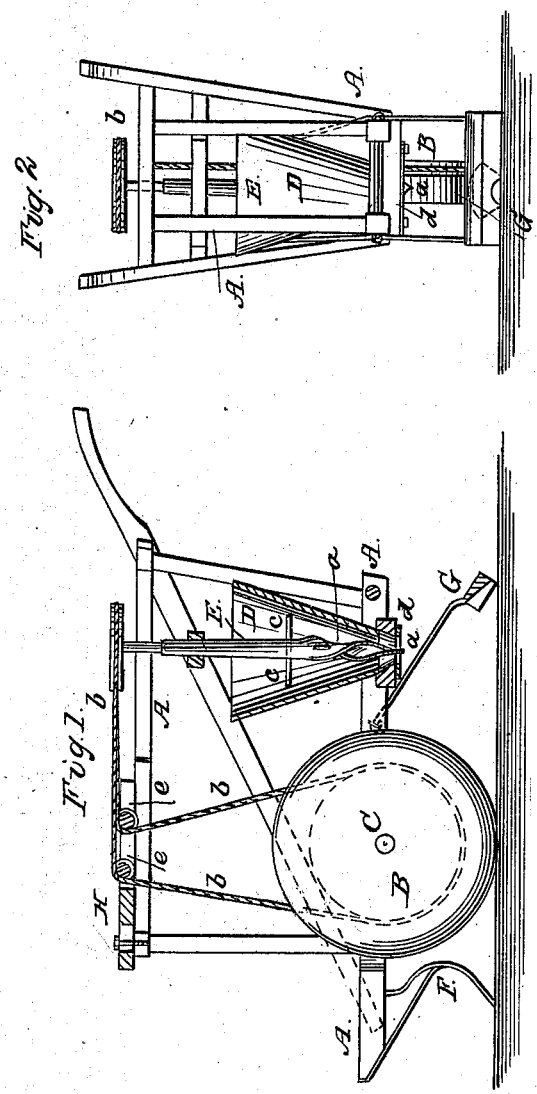

THOMAS C. GARLINGTON, OF CHAMBERS COURT-HOUSE, ALABAMA.

IMPROVED COTTON-SEED PLANTER.

Specification forming part of Letters Patent No. 105,935, dated August 2, 1870.

*To all whom it may concern:*

Be it known that I, THOMAS C. GARLINGTON, of Chambers Court-House, in county of Chambers and State of Alabama, have invented a new and Improved Cotton-Seed Planter; and I do hereby declare that the following is a full, clear, and exact description thereof, which will enable others skilled in the art to make and use the same, reference being had to the accompanying drawing, forming part of this specification, in which—

Figure 1 represents a side elevation, partly in section, of my improved cotton-seed planter. Fig. 2 is a rear elevation of the same.

Similar letters of reference indicate corresponding parts.

This invention relates to a new cotton-seed planter, in which a vertical screw is employed within a hopper for gradually and steadily feeding the seed to the ground.

A in the drawing represents the frame of my improved seed-planter resting upon a wheel, B, which is mounted upon a shaft, C, as shown. D is the seed-hopper. Within it is arranged a vertical shaft, E, which terminates at its lower end in an auger-shaped screw, $a$, that protrudes through the perforated lower end of the hopper. The shaft E receives rotary motion by means of a belt or cord, $b$, from the wheel B. From the shaft E project stirrers $c\,c$, as shown.

F is the furrow-opener, and G the scraper for closing the furrow behind the planter. Against the under side of the hopper is secured a metal plate, $d$, which has a circular aperture embracing the bit $a$. The plate $d$ is fastened by means of screws, so as to be readily removable, and can be replaced by another with a different sized-aperture, to thereby vary the degree of feed.

A tube may be secured to the lower end of the hopper to guide the seed to the ground.

By means of the vertical screw and plate $d$ the seed is fed with great precision and regularity. The weight of the seed aids in the operation of the apparatus and economizes power. The belt $b$ passes over pulleys $e\,e$, that are hung in a frame, H, which is longitudinally adjustable on the frame A to provide for the stretching of said belt.

Having thus described my invention, I claim as new and desire to secure by Letters Patent—

1. The combination of the vertical auger $a$ with the hopper D and removable plate $d$, and with the frame of a seed-planter, as set forth.

2. The belt $b$ for driving the vertical shaft E, when stretched by rollers $e\,e$, which are hung in a longitudinally-adjustable frame, H, as set forth.

THOMAS C. GARLINGTON.

Witnesses:
W. K. FREDERICK,
SHELDON TOOMER.